3,196,389
VEHICLE ENGINE OIL LEVEL AND PRESSURE
RESPONSIVE INDICATOR
Richard C. Heidner, Libertyville, Ill., assignor to
Outboard Marine Corporation, Waukegan, Ill., a
corporation of Delaware
Filed Sept. 26, 1962, Ser. No. 226,350
6 Claims. (Cl. 340—60)

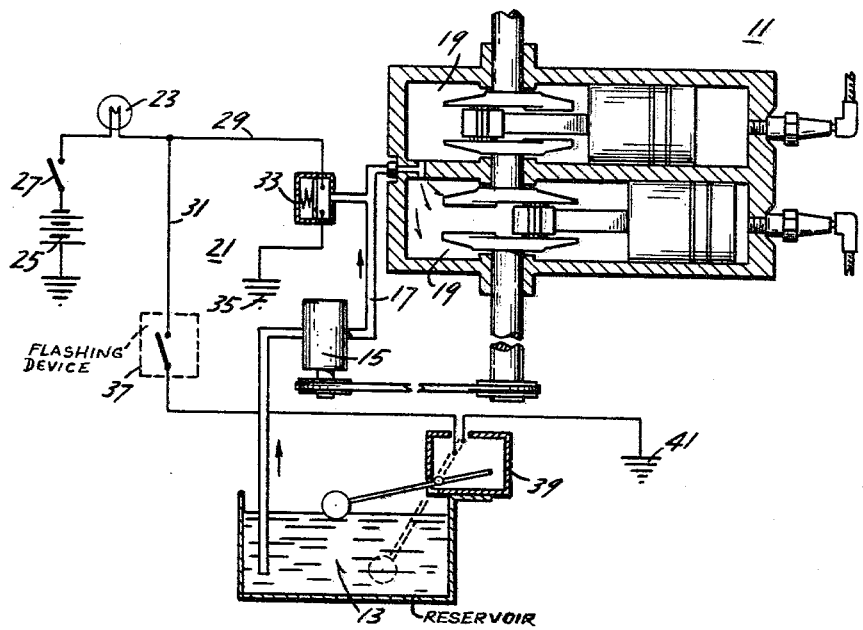

The invention relates generally to electrical indicating circuits and devices. More particularly, the invention relates to machinery, such as internal combustion engines or the like, incorporating means for selectively indicating the existence of one of several specified conditons.

The invention provides an information circuit including a single indicator which is electrically actuatable or energizable so as selectively to inform the operator of the existence of any one of two conditions prevailing in an associated device or piece of equipment. In the particularly disclosed construction, the information circuit is associated with an internal combustion engine including a pressurized lubrication line and an oil reservoir from which oil is conducted into the pressurized line by a pump. The single indicator takes the form of a light bulb which is unlit when a first or normal condition prevails, which is flashed when a second or abnormal condition prevails, as when the oil level in the reservoir drops below a predetermined level, and is continuously illuminated when a third, or second abnormal condition occurs, as when pressure is lost in the lubricating line leading to the engine. Discrimination between the second and third conditions is provided by connecting the light bulb to an electrical source through two parallel switches which are respectively sensitive to the existence of the second and third conditions, closing in response to the development of such conditions, and by inserting a flasher or current interrupter between one of the switches and the light bulb.

Other objects and advantages of the invention will become known by reference to the following description and the accompanying drawing of one embodiment of the invention.

The figure is a partially diagrammatic and partially sectioned view of an engine incorporating various of the features of the invention.

The illustrated embodiment shows a two cycle, two stroke internal combustion engine 11 incorporating a force-feed oil lubricating system including an oil reservoir 13 and a connected pump 15 for delivering oil under pressure to an oil line 17 leading from the pump 15 to the crankcase or crankcases 19 of the engine 11, such as disclosed, for instance, in United States application Serial No. 190,661, filed April 27, 1962, now Patent No. 3,144,095, and assigned to the assignee of this application. Other forms of engine constructions can also be used. The engine 11 also incorporates an information circuit 21 adapted for informing the engine operator of conditions in the oil lubricating system.

The information circuit 21 comprises a single indicator or signalling means in the form of a device such as a light bulb 23 which is electrically energizable to produce a signal by connection to a battery 25 through a switch 27 which may be part of the engine ignition switch. Also electrically connected to the light bulb are a pair of circuit means respectively including parallel leads 29 and 31. The lead 29 extends to a normally open switch 33 which is connected to the oil line 17 and which includes sensor means such as pressure sensitive means operable to effect closure of the switch incident to a drop in pressure in the line 17 below a predetermined level. Since various forms of pressure sensitive switches are commercially available and since the details of the switch construction are not a part of the invention, the switch 33 will not be further described. Closure of the switch 33 connects the bulb 23 to a ground 35, thereby completing a circuit to illuminate the light bulb 23 when the ignition switch 27 is closed, and thereby informing the operator of a condition of low pressure in the oil line 17.

The other lead 31 is connected through a conventional automatic current interrupting means or flashing device 37, as for instance, of the type used in automobile directional signals, to sensor means including a switch 39 which is normally open when the oil reservoir 13 is filled above a preselected level, and which includes means effecting switch closure incident to a drop in oil level below the preselected level. The constructional details of the flashing device 37 and of the switch 39 are not a part of the invention, apart from their co-operation with the other components of the invention, and thus will not be further described. Closure of the switch 39 completes a circuit connecting the light bulb 23 to a ground 41, whereby, when the ignition switch 27 is closed, the light bulb 23 is flashed off and on to inform the operator of the low level of oil in the reservoir 13.

During normal operation of the engine, the light bulb 23 is not energized. However, should the oil level run low in the reservoir 13, the switch 39 closes to flash the light bulb 23 off and on, warning the operator. Should loss of pressure occur in the oil line 17 connected to the engine 11, either by reason of emptying of the oil reservoir 13, by reason of malfunctioning of the pump 15, or for other reasons, the switch 33 closes to complete a circuit and to illuminate the light bulb 23, thereby informing the operator of this condition.

Although the association of the disclosed information circuit 21 with the engine 11, as described herein, has special advantages in connection with an engine oiling system, the disclosed information circuit can also be employed to inform an operator of conditions other than those relating to an oil supply system. For instance, the information circuit could be used with a fuel injection system to indicate a drop in fuel level below a predetermined amount and to indicate a loss of pressure in the injection lines. The circuit could be used in co-operation with thermostatic switches to inform the operator which of three temperature conditions prevails in an engine or other piece of equipment. The information circuit could be used to selectively inform an operator of an over-speed condition, using a centrifugal switch, and of an over-temperature condition using a thermo-sensitive switch.

In its broadest application, the information circuit can be used in association with any device to selectively inform the operator of the existence of any one of three preselected conditions.

Various of the features of the invention are set forth in the following claims.

What is claimed is:
1. Means associated with an engine for selectively indicating the existence of two engine conditions, said means including a single electrically actuatable indicator connected to a source of electrical energy, a pair of normally open electrical switches electrically coupled in parallel with each other and in series to said indicator so as to cause actuation thereof incident to closure of either of said switches, first means associated with said engine and operably connected to one of said pair of switches for closure thereof in response to the development of a first of two engine conditions, whereby to cause actuation of said indicator, second means associated with said engine and operably connected to the other of said pair of switches for closure thereof incident to the development of a second of said two engine conditions, and means connected with said other of said pair of switches for periodically interrupting current flow to said indicator to effect intermittent operation thereof so as to actuate said indicator in a manner which can be discriminated from the actuation of said indicator in response to closure of said one of said pair of switches.

2. A pressurized oil lubricating system for an engine, said system including an oil reservoir, a first electrical switch means sensitive to the oil level in said reservoir and operable to close in response to a drop in the oil level below a predetermined level, a second electrical switch means sensitive to the pressure in said system and operable to close in response to a drop in pressure in said system below a predetermined amount, and means for selectively indicating either of a drop in the oil level below a predetermined level or a drop in pressure in said system below a predetermined amount comprising a single electrically energizable indicator electrically coupled to a source of electrical energy and electrically coupled in series to each of said first and second switch means, said first and second switch means being in parallel with each other, whereby, incident to closing of either of said switch means, a circuit is completed to actuate said indicator, and means electrically coupled to one of said first or second switch means and said indicator for periodically opening said circiut when said one switch means is closed, whereby to intermittently actuate said indicator.

3. A pressurized oil lubricating system for an engine, said system including an oil reservoir, a first normally open electrical switch means sensitive to the oil level in said reservoir and operable to close in response to a drop in the oil level below a predetermined level, a second normally open electrical switch means sensitive to the pressure in said system and operable to close in response to a drop in pressure in said system below a predetermined amount, and means for selectively indicating either a drop in the oil level or a drop in pressure in said system below a predetermined amount comprising a single light bulb connected to a source of electrical energy and separately connected in series to each of said first and second switch means, whereby, incident to closing of either of said switch means, a circuit is completed to illuminate said light, and means interposed between one of said first and second switch means and said light for periodically opening said circuit when said one switch means is closed, whereby to flash said light.

4. An engine condition indicating circuit comprising an electrically actuatable indicator connected to a source of electrical energy, a pair of parallel electrical leads extending from said indicator, a first switch sensitive to the development of a first engine condition, said switch being electrically connected to one of said leads, whereby development of said first condition results in operation of said switch to cause actuation of said indicator, a second switch sensitive to the development of a second engine condition, said switch being electrically connected to the other of said leads, whereby development of said second condition results in operation of said second switch to effect actuation of said indicator, and automatic means electrically connected to said other lead for periodically interrupting current flow through said indicator when said second switch is closed so as to cause intermittent actuation of said indicator.

5. An engine condition indicating circuit comprising an electrically actuatable indicator connected to a source of electrical energy, a pair of parallel leads extending from said indicator, a first normally open switch sensitive to the development of a first engine condition, said switch being electrically connected to one of said leads, whereby development of said first engine condition results in the closure of said switch and the completion of a first circuit through said indicator to cause actuation thereof, a second normally open switch sensitive to the development of a second engine condition, said switch being electrically connected to the other of said leads, whereby development of said second engine condition results in the closure of said second switch to complete a second circuit through said indicator, and automatic means electrically connected to said other lead for periodically interrupting said second circuit through said indicator so as to cause intermittent actuation thereof.

6. An engine condition indicating circuit comprising a light bulb connected to a source of electrical energy, a pair of parallel electrical leads extending from said light bulb, a first normally open switch connected to a fluid pressure line, said first switch being sensitive to, and closing incident to, loss of pressure in said line below a preselected fluid pressure level, and being connected to one of said leads and to a ground, whereby loss of pressure below said preselected fluid pressure level results in the completion of a first circuit through said light bulb to cause illumination thereof, a second normally open switch connected to a fluid retaining reservoir, said second switch being sensitive to, and closing incident to, a drop in level of the fluid below a predetermined level in the reservoir and being electrically connected to the other of said leads and to a ground, whereby a drop in fluid below said level results in the completion of a second circuit through said light bulb, and automatic means electrically connected to said other lead for periodically interrupting said second circuit so as to cause intermittent illumination of said light bulb when said second switch is closed.

References Cited by the Examiner
UNITED STATES PATENTS 2,571,360  10/51  Hallerberg _____ 340—52
2,671,893   3/54  Van Scoy et al. ____ 340—270 XR NEIL C. READ, *Primary Examiner.*